United States Patent
Simmons

(10) Patent No.: US 9,286,241 B2
(45) Date of Patent: Mar. 15, 2016

(54) CRYPTOGRAPHIC TRANSMISSION SYSTEM

(71) Applicant: Microchip Technology Incorporated, Chandler, AZ (US)

(72) Inventor: Michael Simmons, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 122 days.

(21) Appl. No.: 13/771,572

(22) Filed: Feb. 20, 2013

(65) Prior Publication Data

US 2013/0219189 A1   Aug. 22, 2013

Related U.S. Application Data

(60) Provisional application No. 61/601,253, filed on Feb. 21, 2012.

(51) Int. Cl.
 *G06F 12/14*  (2006.01)
 *H04L 9/08*  (2006.01)
 *G06F 21/00*  (2013.01)

(52) U.S. Cl.
 CPC ............ *G06F 12/1408* (2013.01); *G06F 21/00* (2013.01); *H04L 9/0822* (2013.01)

(58) Field of Classification Search
 CPC .... G06F 21/00; G06F 12/1408; H04L 9/0822
 USPC ............................. 713/171, 189; 380/259, 281
 See application file for complete search history.

(56) References Cited

U.S. PATENT DOCUMENTS

| | | | |
|---|---|---|---|
| 5,237,611 A | 8/1993 | Rasmussen et al. | 380/284 |
| 8,661,266 B2* | 2/2014 | Hakkarainen et al. | 713/193 |
| 2001/0015919 A1* | 8/2001 | Kean | 365/200 |
| 2001/0033012 A1* | 10/2001 | Kommerling et al. | 257/679 |
| 2005/0091487 A1* | 4/2005 | Cross et al. | 713/165 |
| 2007/0162964 A1* | 7/2007 | Wang et al. | 726/5 |
| 2009/0060197 A1* | 3/2009 | Taylor et al. | 380/277 |
| 2009/0106555 A1* | 4/2009 | Buer | 713/176 |
| 2011/0012857 A1* | 1/2011 | Irie | 345/173 |
| 2011/0072276 A1* | 3/2011 | Lee et al. | 713/189 |
| 2011/0167278 A1* | 7/2011 | Goto et al. | 713/193 |
| 2012/0036317 A1* | 2/2012 | Torii | 711/108 |
| 2013/0028414 A1* | 1/2013 | Randell | 380/44 |
| 2013/0219189 A1* | 8/2013 | Simmons | 713/189 |
| 2014/0089681 A1* | 3/2014 | Goto et al. | 713/190 |

FOREIGN PATENT DOCUMENTS

EP   1387237 A2   2/2004 ............. G06F 12/14

OTHER PUBLICATIONS

Hruby et al, Ruler: High-Speed Packet Matching and Rewriting on NPU's, Dec. 4, 2007, ACM, pp. 1-10.*

(Continued)

*Primary Examiner* — Christopher Brown
*Assistant Examiner* — Jenise Jackson
(74) *Attorney, Agent, or Firm* — Slayden Grubert Beard PLLC

(57) ABSTRACT

A microcontroller includes on-chip key storage slots stored in a non-volatile memory, wherein selecting which key is to be used is restricted to software, wherein a predetermined key storage slot stores a Key Encrypt Key (KEK), and a register flag is provided for determining whether the predetermined key storage slot stores a key for encrypting/decrypting data or the KEK for encrypting/decrypting a key.

20 Claims, 3 Drawing Sheets

(56) References Cited

OTHER PUBLICATIONS

Kim et al, Considerations of Extending SQL on Encrypted Data in UniSQL, Feb. 14, 2007, IEEE, pp. 587-590.*

International Search Report and Written Opinion, Application No. PCT/US2013/026891, 10 pages, Aug. 13, 2013.

* cited by examiner

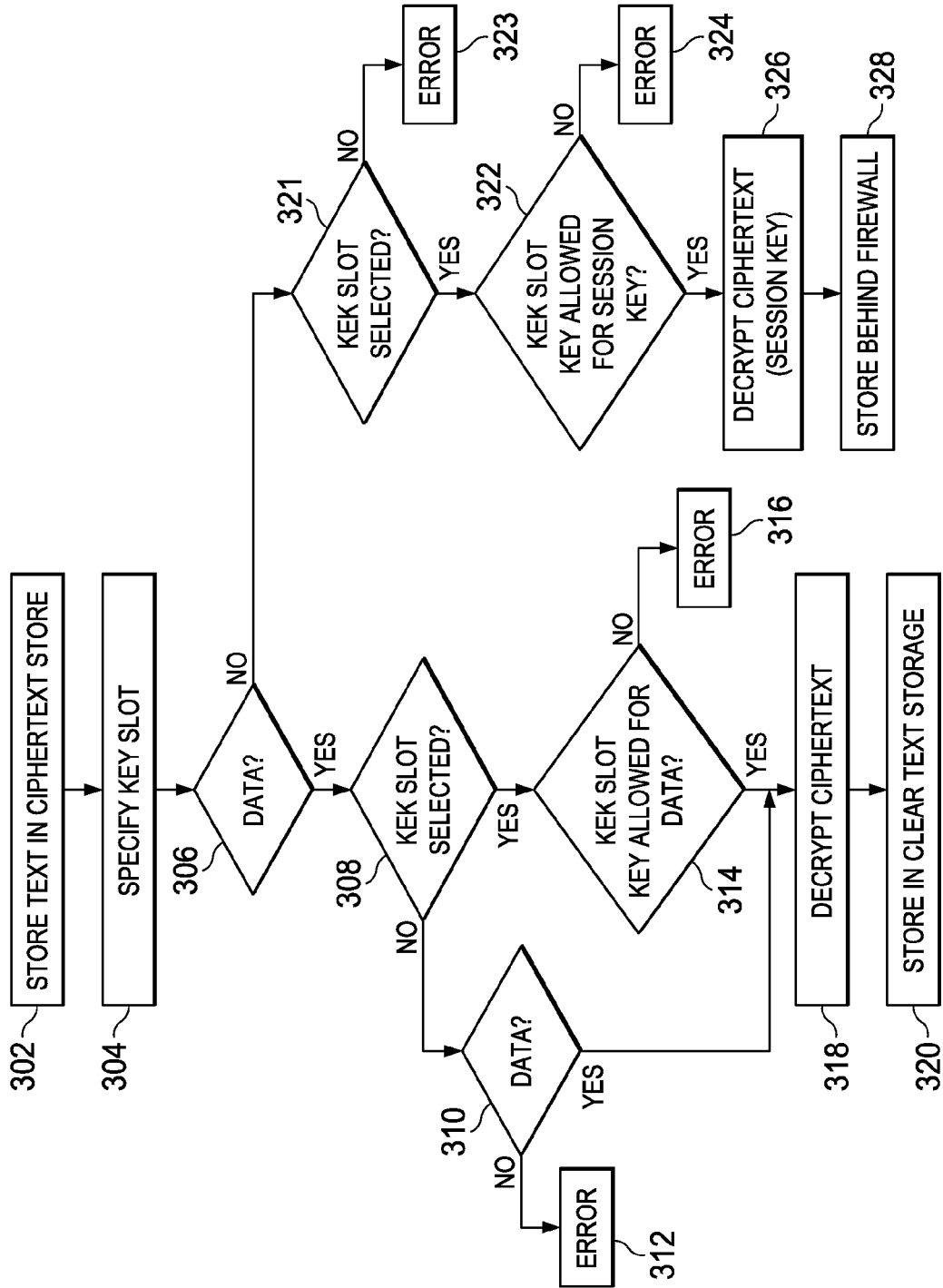

CRYPTOGRAPHIC TRANSMISSION SYSTEM

CROSS REFERENCE TO RELATED APPLICATIONS

This application claims priority from commonly assigned, U.S. Provisional Patent Application Ser. No. 61/601,253, filed Feb. 21, 2012, which is hereby incorporated by reference in its entirety as if fully set forth herein.

TECHNICAL FIELD

The present disclosure relates to a cryptographic transmission system and method for cryptographic transmission.

BACKGROUND

In cryptography, there are two common methods for sharing cryptographic keys among two or more nodes wishing to communicate encrypted data/traffic: public key encryption and private (shared) key encryption. In public key systems, session keys are generated based on some temporal constraints and exchanged through the use of a public key exchange (PKE) protocol. Modern PKE schemes are based on asymmetric encryption, which is extremely computationally intensive.

In some applications, exchange of keys can be performed using private key encryption. In private key encryption, a "master" key (called a Key Exchange Key, or KEK) is somehow pre-loaded into all nodes and subsequent data encryption keys (typically called "session keys") are shared by encrypting/decrypting them with the KEK.

Thus, in "pre-shared" key systems, both sides (nodes) of a secure communication channel use the same pre-defined key. Such as system is easy to use. However, if the key is compromised (through non-invasive side channel attacks), the whole system is compromised. In particular, software can always take the received Session Key, load it into the system as Ciphertext (rather than as a key) and run a standard Decrypt operation to recover the Session Key "in the clear."

Thus, there exists a need for a secure way of storing and using the KEK without risk of exposing it to software. Existing solutions use either pre-shared keys, which is efficient but lower security or public key exchange, which is more secure, but extremely computationally intensive.

SUMMARY

These and other drawbacks in the prior art are overcome in large part by a system and method according to embodiments of the present invention. Embodiments provide a solution with the efficiency of pre-shared keys, but higher security.

A microcontroller according to embodiments includes on-chip key storage slots stored in a non-volatile memory, wherein selecting which key is to be used is restricted to software, wherein a predetermined key storage slot stores a Key Encrypt Key (KEK), and a register flag is provided for determining whether the predetermined key storage slot stores a key for encrypting/decrypting data or the KEK for encrypting/decrypting a key.

Embodiments provide a configuration bit to select between Data Encryption/Decryption and Key Encryption/Decryption modes. In some embodiments, this bit may have the same security permissions as the keys themselves. Embodiments may further provide a scheme where encrypt/decrypt operations are done by specifying which key is to be used, rather than the key itself. Some embodiments further provide a logical division of data (results) registers (called TEXT registers) and key register(s) (called KEY register), which data storage having software Read/Write functionality and key storage either completely inaccessible to software or having only software Write functionality. Embodiments may provide a hardware mechanism to select the source of a key for all data encrypt/decrypt operations between the non-volatile key storage and the volatile KEY register based on software selection of the type of operation being performed, and a hardware mechanism to select the destination for the result of all decrypt operations to either the data storage (TEXT) or to the key storage (KEY), based on the value configuration bit and the software selected key source.

A system according to various embodiments dedicates at least one on-chip key storage slots for Key Encrypt Key storage, and only allows software to select which key is to be used, rather than the key itself. Various embodiments may also apply to storage of large key sets in flash (versus transmission of keys over a communications channel). In some embodiments, users can select the functionality of the KEK slot(s) between "normal" (encrypt/decrypt data) and "KEK" (encrypt/decrypt key) using one or more bits that are tied to the KEK slot(s) itself.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3 is a flowchart illustrating operation of embodiments.

DETAILED DESCRIPTION

Figure 1:
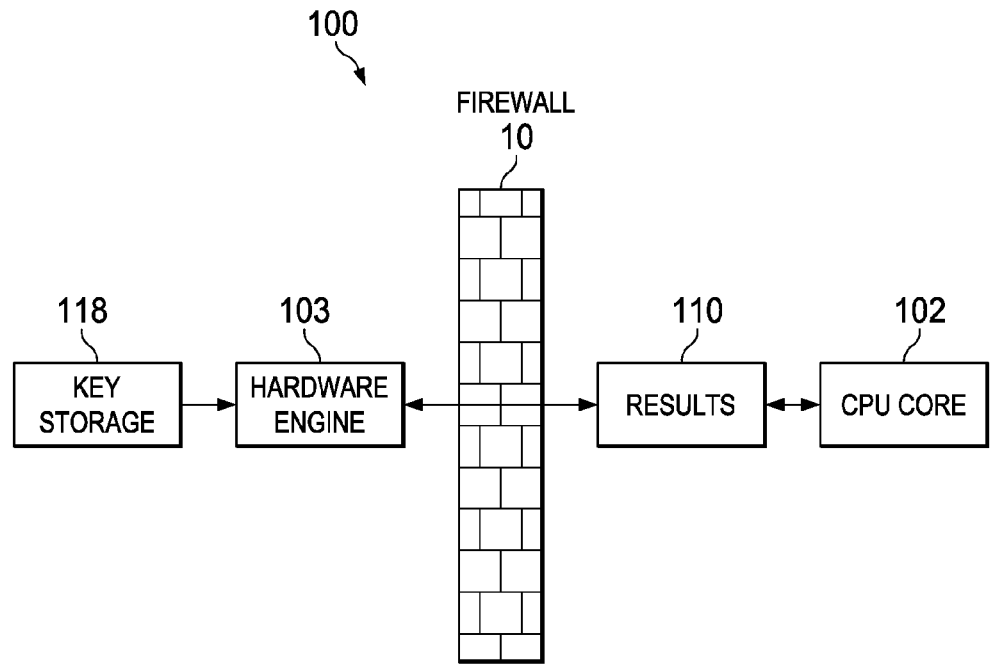
FIG. 1 is a block diagram of an exemplary processor.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

As will be described in greater detail below, a microcontroller implementing an encryption/decryption scheme according to embodiments may comprise on-chip key storage slots stored in a non-volatile memory, wherein only software can select which key is to be used. A predetermined key storage slot stores a Key Encrypt Key, and a register flag is used for determining whether the predetermined key storage slot stores a key for encrypting/decrypting data or the KEK for encrypting/decrypting a key. Further, according to some embodiments, encrypt/decrypt operations are done by specifying which key is to be used, rather than the key itself.

In some embodiments, a logical division of data (results) registers (called TEXT registers) and key registers (called KEY register) is maintained, in which data storage has software Read/Write functionality and key storage is either completely inaccessible to software or having only software Write functionality.

In some embodiments, a hardware mechanism is used to select the source of a key for all data encrypt/decrypt operations between the non-volatile key storage and the volatile KEY register based on software selection of the type of operation being performed. In addition, a hardware mechanism may be employed to select the destination for the result of all decrypt operations to either the data storage (TEXT) or to the key storage (KEY), based on the value of the configuration bit and the software selected key source.

In some embodiments, one or more of the on-chip key storage slots are dedicated as Key Encrypt Key slots, and software is only allowed to select which key is to be used, rather than the key itself. Thus, according to some embodiments, software pre-programs keys in (or done at) the factory.

It is noted that the principles according to various embodiments apply to both transmitted Session Keys and to storage of large encrypted key sets in Flash. Thus, some embodiments may apply to storage of large key sets in flash (versus transmission of keys over a communications channel). In this case the keys are stored in Flash in an encrypted format, and the KEK is used to decrypt the key when it is to be used.

In some embodiments, users may select the functionality of the KEK slot between "normal" (encrypt/decrypt data) and "KEK" (encrypt/decrypt key) using a bit that is tied to the KEK slot itself (i.e., if the key storage is not one-time programmable (OTP), then erasing the KEK slot will erase the selection bit, and vice-versa). In some embodiments, such a bit is set at the factory. Similarly, if the key storage were implemented in non-volatile memory (NVM), then the bit would need to be implemented in NVM sharing the same read/write/erase permissions scheme as the key storage.

It is further noted that, while described in the context of a single KEK in a single storage slot and a single bit tied to the storage slot, in principle, more than one KEK and more than one KEK slot and corresponding bit(s) may be utilized.

Figure 4:
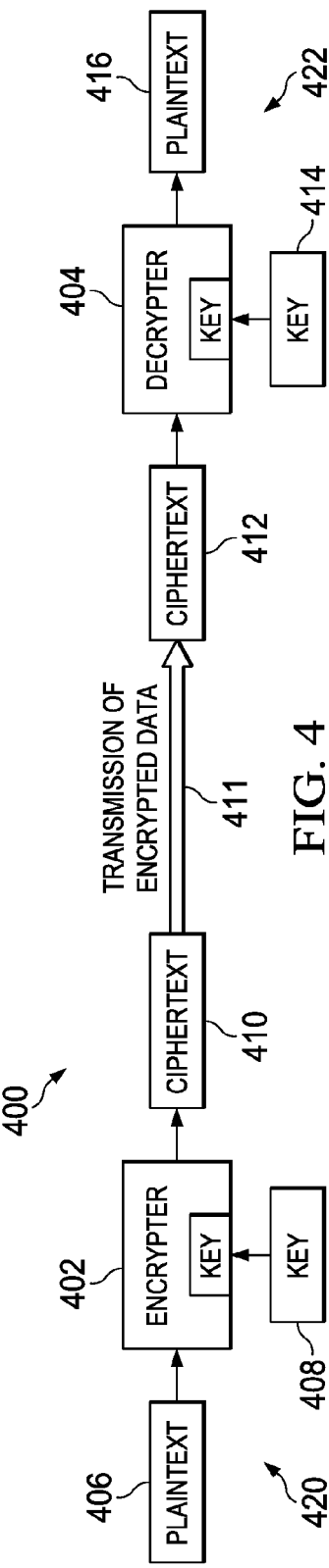
FIG. 4 is a diagram illustrating a network configuration for operation of embodiments.

Turning now to FIG. 4, a diagram illustrating an exemplary network configuration of an encryption/decryption system is shown. The system 400 includes a transmitting node 420 and a receiving node 422. The transmitting node 420 includes an encrypter 402 configured to receive plaintext 406 (i.e., data to be encrypted), and an encryption key 408. The encrypter 402 uses the encryption key 408 to encrypt the plaintext data 406. The resulting output is ciphertext 410.

The ciphertext 410 is transmitted via a network 411 to receiving node 422. The network 411 may be any of a variety of network types including, for example, the Internet or a local area network (LAN). The network may likewise employ wired or wireless transmission media. The encrypted data is received at the node 422 as ciphertext 412. The node 422 includes a decrypter 404 that receives a decryption key 414 corresponding to the encryption key 408. The decrypter 404 decrypts the ciphertext 412 using the key 414. The decrypted data is then stored as plaintext 416. As will be explained in greater detail below, embodiments are provided for managing the keys.

In typical implementations, a KEK key may be pre-shared between transmitting 420 and receiving nodes 422. A Session Key may be generated and encrypted using the KEK on a predetermined periodic or random basis and sent to the various nodes. Systems according to embodiments choose whether the received cipher text is data or a Session Key and specify which key is to be used for deciphering the data or Session Key, as will be explained in greater detail below.

Turning now FIG. 1, a block diagram schematically illustrating an exemplary processor or microcontroller configuration for implementing an encryption/decryption system, including the encrypter 402 and decrypter 404, is shown and generally identified by the reference numeral 100. It is noted that other configurations of a processor or microcontroller are possible. Thus, the figure is exemplary only.

In the example illustrated, microcontroller 100 includes a central processing unit (CPU) core 102. The CPU core 102 may communicate, e.g., via a bus, with one or more control/status registers and program memory (not shown). In some embodiments, the CPU core 102 communicates with storage 110. The storage 110 may store data to be decrypted as well as data that has been decrypted and data that is to be encrypted (i.e., cipher text and plaintext).

In some embodiments, a firewall 10 separates the CPU core 102 from the hardware encryption/decryption engine 103 and key storage 118. The key storage 118 is programmatically secure, i.e., cannot be accessed (read or written to) by the CPU core 102; it may be accessible only by the hardware engine 103. In some embodiments, the key storage 118 may store up to seven (7) DES (Data encryption standard) or four (4) AES (advanced encryption standard) keys.

The key storage 118 may be implemented in any suitable manner. Suitable forms of key storage include, for example, one-time programmable memory, nonvolatile memory, and battery backed static random access memory (SRAM).

Figure 2A:
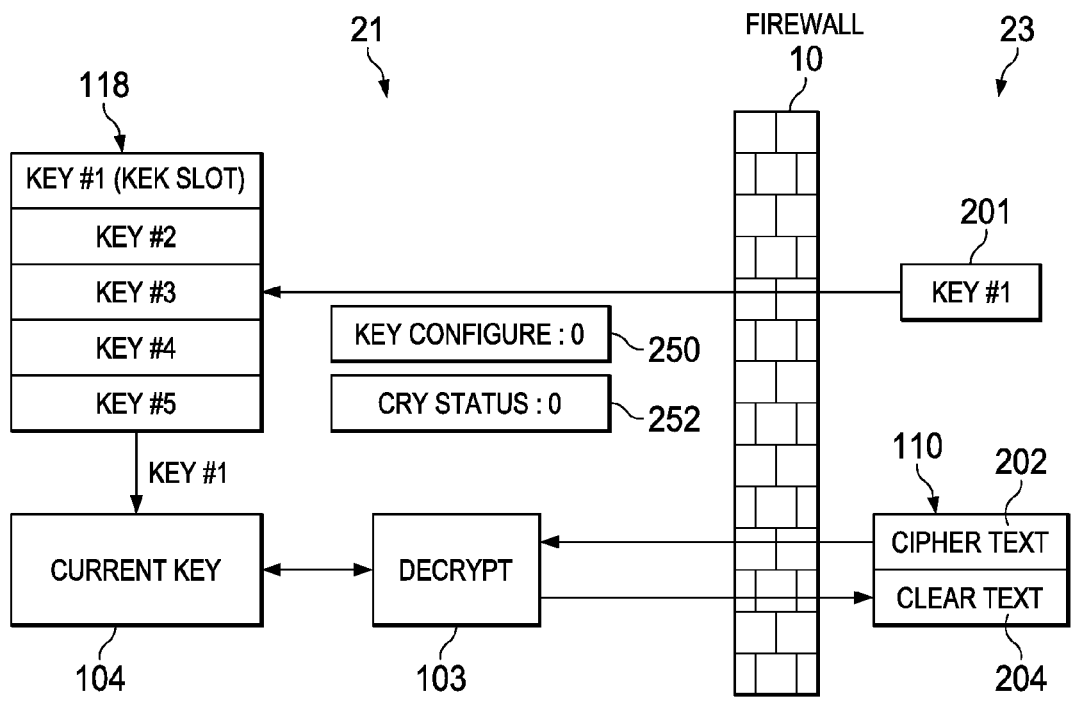
FIG. 2A and FIG. 2B are a block diagrams schematically illustrating operation of embodiments.
Figure 2B:
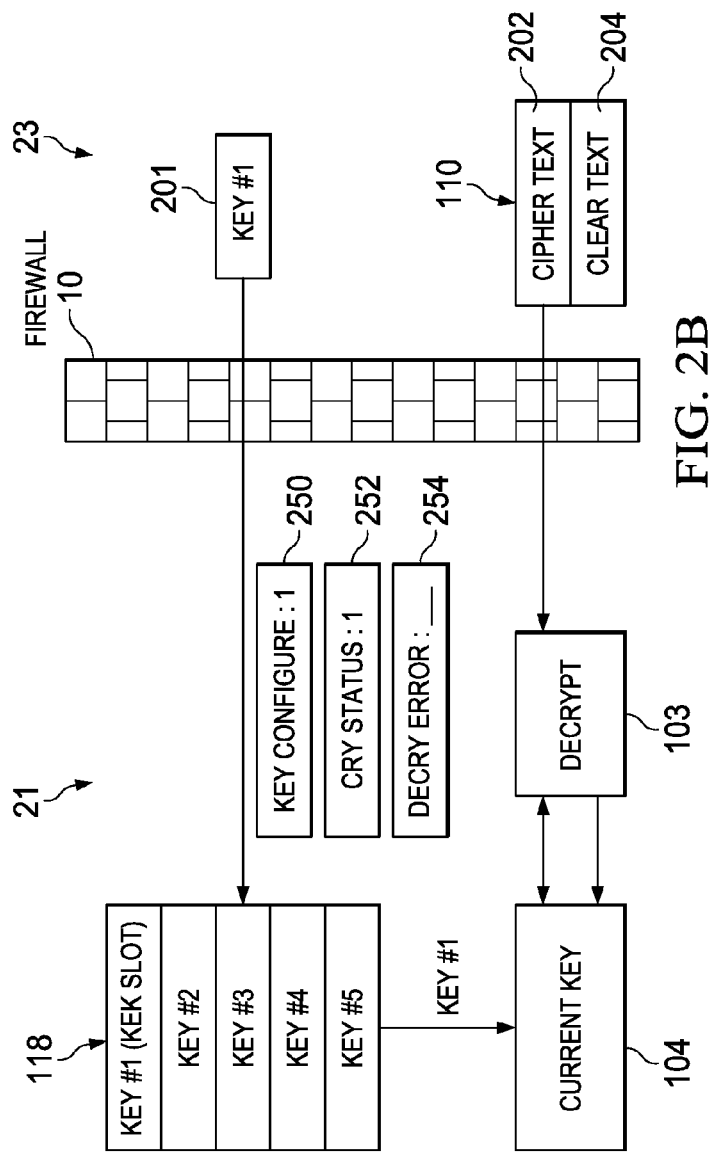

Operation of embodiments is shown schematically in FIG. 2A and FIG. 2B.

In particular, FIG. 2A schematically illustrates use of Key #1 (the "KEK slot") for data decrypting. On either side of firewall 10 is a hardware engine side 21 and a CPU side 23. Items on the hardware engine side 21 are accessible only by the encrypt/decrypt hardware engine 103, whereas the CPU 102 can read and write everything on the CPU side 21.

In particular, shown behind firewall 10 are programmatically secure key storage 118, a current key register 104, decryption module 103, and registers 250, 252. In some embodiments, register 250 is a key configuration register and register 252 is an encryption status register. In some embodiments, at least one slot of the programmatically secure key storage 118 is designated for either data encryption/decryption or for use as a KEK key(s) for session key encryption/decryption.

On the other side of the firewall 10 are key select register 201 and portions of data memory 110 assigned for storing cipher text 202 or clear text 204. Cipher text 202 stores text that is to be decrypted, while clear text 204 stores text that has been decrypted.

When a data encryption/decryption operation is to be implemented, a key is selected using software as shown at 201 (The key itself is not stored at register 201, only instructions telling the HW engine to use the key in the slot designated). To be able to select the KEK key for data decryption, in certain embodiments, one or more configuration bits, for example, in the key configure register 250 may have been (or must have been) suitably set by hardware. In the example illustrated, they set to "0." A status bit in the encryption status register 252 may be likewise then set to the appropriate corresponding status.

When a data decryption operation has been selected, the corresponding key is loaded into current key register 104. The current key (in this instance, Key #1, or the KEK key) is accessed by the decryption module 103. The decryption module 103 reads data from the cipher text storage 202, decrypts the text using the current key from the current key register 104, and writes the decrypted text back to the clear text storage 204. It is noted that, in some embodiments, the storage location for decrypted data may be different depending on which key has been used to decrypt the data.

FIG. 2B illustrates use of the KEK key to decrypt a session key. More particularly, encrypted text is received and stored in the cipher text storage 202. Instructions accompanying the encrypted text select which key is to be used and set the key select register 201. Thus, in the embodiment illustrated, to decipher the session key, the key in the KEK slot is selected, using appropriate instructions from register 201. In this case, the session key operation is allowed because one or more configuration bits, for example, of the key configuration register 250 is (or has been) set by hardware to allow use of the KEK key for session key decrypting. Similarly, the status bit of the status register 252 may be correspondingly set. It is noted that in some embodiments, a particular key slot may be exclusively designated for use as a KEKE key. In either case, in operation, the KEK key is loaded into the current key register 104. The decryption module 206 uses the key from the current key register and accesses the encrypted data from the cipher text store 202. Because the KEK key functionality has been selected, the decrypted text (i.e., the session key) from the cipher text store 202 is returned not to the clear text store 204, but to the current key register 104.

Thus, in addition to selecting or permitting use of the designated key as a KEK key, setting of the key configuration register 250 may select where the decrypted data is to be sent: either to the current key register (for session key decrypting) or to the clear text store 204 (in the case of data decrypting). In other embodiments, other configuration registers or hardware mechanisms may be used to specify whether decrypted data gets stored in the current key register or the clear text store. Still other embodiments may specify where in clear text store 204 data is to be stored, depending on which key has been selected.

Advantageously, the decrypted session key is always stored behind the firewall 203 and cannot be accessed by software. The decrypted session key is then used to decrypt cipher text, as desired, in a manner generally similar to that described with regard to FIG. 2A.

As noted above, according to embodiments, when the key configuration bit in the key configuration register 250 is set, the KEK key (e.g., the key in slot #1) cannot be used to decipher "regular" data. If the KEK key is requested for use in a text decryption (or encryption) operation, then a decryption error bit may be set in a decryption error register 254. In this case, no encrypt or decrypt operations may be allowed until the key select register 201 has an appropriate value.

Turning now to FIG. 3, a flowchart illustrating operation of embodiments is shown. In particular, the flowchart 300 of FIG. 3 illustrates decryption of data using a session key in accordance with embodiments.

Initially, software may specify that a decryption operation is to be performed. For example, data may be received from another node and stored in a portion of the ciphertext store 202, in a process step 302. A key may be identified, in a process step 304. For example, according to embodiments, software instructions may set the key select register 201 to select a key slot corresponding to a key that is to be used. In addition, a specification may be made if the text corresponds to data or to a session key, in a process step 306. A variety of methods are known for making such a specification, such as one or more instructions or commands accompanying the data transmission.

In a process step 308, if the cipher text is data, the microcontroller may determine if a key in a KEK slot had been selected. If the selected slot does not correspond to a KEK key slot, then if the cipher text is a session key (step 310), then an error may be generated (step 312), such as by setting one or more bits in a decryption error register. If the cipher text is data, then the data will be decrypted (step 318) and stored as clear text in a clear text store accessible by software (step 320).

If in step 308, the KEK key slot had been selected, and if the received cipher text was data, then it is determined if the key in the KEK slot is allowed to be used to decipher data (step 314). For example, one or more configuration bits, such as a KEK encryption bit or bits in a register such as the encryption status register 252, may be checked. If the KEK slot key is not allowed to be used for deciphering data, then an error may be signaled (step 316), such as by setting one or more error bits in a decryption error register 254. In such embodiments, the decryption module of the CPU core may not perform any decryptions or encryptions until a valid key is specified in the key select register 201.

If the KEK slot key is allowed to be used for deciphering data, then the cipher text will be decrypted (step 318) and stored in the clear text storage accessible to software (step 320).

If in step 306, the cipher text is determined to be a session key, then in a step 321, it is determined if a key in a KEK slot has been selected Step 321). If not, then an error may be generated (step 323). If a key in a KEK slot is selected, then in a step 322, it is determined if the key in the KEK slot is allowed to be used for deciphering a session key. For example, one or more bits in a configuration or status register may be checked. If the key in the KEK slot is not allowed to be used for deciphering text, then an error may be indicated, such as by setting one or more bits in an error register (step 324).

If the key in the KEK slot is allowed to be used for deciphering a session key, then the cipher text will be decrypted (step 326). Rather than being stored as clear text in a clear text storage 204 accessible to software, however, the session key is stored behind the firewall 10. For example, the session key may be loaded into a current key register (step 328) and/or stored in key storage 118. The decrypted session key may then be used to decrypt data, as discussed above.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A microcontroller comprising:
   a central processing unit,
   a plurality of secure on-chip key storage slots arranged in a non-volatile memory for storing keys, wherein the secure on-chip key storage slots are each configured to store either a Key Encryption Key (KEK) or a key for encrypting/decrypting data and a hardware encryption/decryption engine coupled with the non-volatile memory for storing keys and being configured to have access to a selected key, wherein the secure on-chip key storage slots can only be accessed by the hardware encryption/decryption engine and cannot be accessed by the CPU thereby forming a firewall between non-volatile memory coupled with the encryption/decryption engine which are inside the firewall and the CPU which is outside the firewall, and
   a select register coupled with the CPU and configured to select one of the on-chip key storage slots through said firewall wherein a content of the selected on-chip key storage slot is transferred to a key register and accessible to the hardware encryption/decryption engine through the key register, wherein a predetermined key storage slot is configured to store a Key Encryption Key (KEK), and a configuration register coupled with the hardware encryption/decryption engine comprises a register flag for determining whether a selected key storage slot stores a key for encrypting/decrypting data or the KEK for encrypting/decrypting a key.

2. The microcontroller according to claim 1, wherein the non-volatile memory is a one-time programmable memory.

3. The microcontroller according to claim 1, wherein the non-volatile memory is a flash memory, wherein the keys are stored in an encrypted format and wherein the KEK can be used to decrypt the keys.

4. The microcontroller according to claim 1, wherein if said register flag is set and the predetermined key slot is used for an encryption or decryption operation, a key configuration error is generated.

5. The microcontroller according to claim 1, wherein the register flag is not accessible by the CPU.

6. The microcontroller according to claim 1, wherein the hardware encryption/decryption engine is configured to select a destination for encrypted data based on whether the register flag for the KEK selection is set and which key of a plurality of keys has been selected.

7. The microcontroller according to claim 1, further comprising a current key register coupled with the hardware encryption/decryption engine, wherein the current key register stores a selected key or a decrypted key.

8. The microcontroller according to claim 1, further comprising an error status register, wherein an error stored in the error status register prevents said hardware encryption/decryption engine to perform any encryption or decryption operations.

9. A method for handling encryption keys in processor microcontroller, comprising:
   selecting a key encryption key (KEK) from a predetermined one of a plurality of key storage slots arranged in non-volatile memory through a select register coupled with a CPU of the microcontroller, wherein the plurality of key storage slots are each configured to store either a Key Encryption Key (KEK) or a key for encrypting/decrypting data and wherein the on-chip key storage slots can only be accessed by a hardware encryption/decryption engine and cannot be accessed by the CPU of the microcontroller thereby forming a firewall between non-volatile memory coupled with the hardware encryption/decryption engine which are inside the firewall and the CPU which is outside the firewall;
   transferring a content of the selected on-chip key storage slot to a key register which is accessible to the hardware encryption/decryption engine;
   checking a register flag in a configuration register coupled with the hardware encryption/decryption engine to determine if the key encryption key is to be used for encrypting/decrypting data or encrypting/decrypting a session key; and
   if the key encryption key is to be used for encrypting/decrypting a session key, preventing the key encrypt key from encrypting/decrypting data.

10. The method according to claim 9, wherein the non-volatile memory is a one-time programmable memory.

11. The method according to claim 9, wherein the non-volatile memory is a flash memory, wherein the keys are stored in an encrypted format and wherein the KEK can be used to decrypt the keys.

12. The method according to claim 9, wherein if said register flag is set and the predetermined key slot is used for an encryption or decryption operation, a key configuration error is generated.

13. The method according to claim 9, wherein the register flag and the keys share a level of security permission.

14. The method according to claim 9, further including selecting a destination for encrypted data based on whether the register flag for the KEK selection is set and which key of a plurality of keys has been selected for encrypting/decrypting data.

15. The method according to claim 9, wherein the non-volatile memory is a one-time programmable memory.

16. The method according to claim 9, wherein the non-volatile memory is a flash memory, wherein a plurality of keys are stored in an encrypted format and wherein the KEK or dual mode encryption key is used to decrypt the keys.

17. The method according to claim 9, wherein if said status bit is set and the encryption key slot is used for an encryption or decryption operation, a key configuration error is generated.

18. The method according to claim 9, wherein the status bit is not accessible by the CPU.

19. The method according to claim 9, further including selecting a destination for decrypted data based on whether the status bit for the dual mode encryption key selection is set and which key of a plurality of keys has been selected for encrypting/decrypting data.

20. A method for handling encryption keys in processor microcontroller comprising, a CPU, a hardware encryption/decryption engine, and a non-volatile memory with a plurality of key storage slots for storing keys, wherein each key storage slot is configured to store either a Key Encryption Key (KEK) or a key for encrypting/decrypting data, wherein the on-chip key storage slots can only be accessed by the hardware encryption/decryption engine and cannot be accessed by the CPU thereby forming a firewall between non-volatile memory coupled with the hardware encryption/decryption engine which are inside the firewall and the CPU which is outside the firewall, the method comprising:

providing a dual mode encryption key among the plurality of keys in the plurality of key storage slots in the non-volatile memory; and defining whether the dual mode encryption key is to be used to encrypt/decrypt data or encrypt/decrypt a session key by a register flag in a configuration register coupled with the hardware encryption/decryption engine;

selecting one of the key storage slots through a select register coupled with the CPU thereby transferring a content of the selected key storage slot to a key register which is accessible to the hardware encryption/decryption engine;

wherein if the dual mode encryption key is selected to be used to encrypt/decrypt a session key, the dual mode encryption key cannot be used to encrypt or decrypt data.

* * * * *